(12) United States Patent
Talty et al.

(10) Patent No.: US 10,140,838 B2
(45) Date of Patent: Nov. 27, 2018

(54) AUTOMATIC TRANSMISSION OF REMINDERS FOR DEVICES LEFT BEHIND

(71) Applicant: GM GLOBAL TECHNOLOGY OPERATIONS LLC, Detroit, MI (US)

(72) Inventors: Timothy J. Talty, Beverly Hills, MI (US); David R. Petrucci, Warren, MI (US); Gregg R. Kittinger, Oakland Township, MI (US); Donald K. Grimm, Utica, MI (US); Wen Gu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/465,063

(22) Filed: Mar. 21, 2017

(65) Prior Publication Data
US 2018/0276974 A1 Sep. 27, 2018

(51) Int. Cl.
*G08B 1/08* (2006.01)
*G08B 21/24* (2006.01)
*H04L 29/08* (2006.01)

(52) U.S. Cl.
CPC ............ *G08B 21/24* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,327,645 B2 * | 5/2016 | Raman | G08B 21/24 |
| 9,715,816 B1 * | 7/2017 | Adler | G08B 21/24 |
| 2017/0084175 A1 * | 3/2017 | Sedlik | G08G 1/0112 |

* cited by examiner

*Primary Examiner* — Adolf Dsouza
(74) *Attorney, Agent, or Firm* — Cantor Colburn LLP

(57) ABSTRACT

A method for generating and transmitting a reminder message includes obtaining a unique user profile. The user profile includes a user identification (ID) indicative of a unique user, an object ID indicative of a unique object, and a device ID indicative of a unique mobile device. The processor is configured to predict a spatial relationship between the user, the object, and the mobile device. The prediction is based, in part, on the user ID, the object ID, and the device ID, where the prediction includes a geographic location for the user, the object, and/or the mobile device. The processor compares a location of at least two of the user, the object and the mobile device with the prediction of the user's spatial relationship with the object and the mobile device. The processor transmits a reminder message when the prediction of the spatial relationship exceeds a predetermined threshold.

18 Claims, 8 Drawing Sheets

AUTOMATIC TRANSMISSION OF REMINDERS FOR DEVICES LEFT BEHIND

INTRODUCTION

The subject disclosure relates to automated message communication, and more particularly to automatic reminder messages for devices left behind.

It is not uncommon for a person to regularly carry multiple personal items such as bags, wallets, and mobile devices, among other things. As an individual changes location in a busy day, it is easy to drop an item or simply misplace it and leave for the next destination without realizing that the item is missing. It is also not uncommon to carry various combinations of personal items to the same locations, events, etc. For example, a person leaving their home to go to their office may generally carry their wallet, their bag, a case for their reading glasses, and a lunch bag. Leaving an item behind, although not lost, can be frustrating when they have arrived at their office, for example, and their reading glasses are still at home. A left behind device or item can be frustrating, time consuming to retrieve, and at times expensive when the item left behind becomes permanently lost. In an emerging vehicle share environment, this problem becomes more complicated as an individual may arrive at a destination in one vehicle and depart for another destination in a different vehicle.

Accordingly, it is desirable to provide a system for automated generation and transmission of reminder messages.

SUMMARY

In one exemplary embodiment, a computer-implemented method for generating and transmitting a reminder message is described. The method includes obtaining, via a processor, a unique user profile. The user profile includes a user identification (ID) indicative of a unique user, an object ID indicative of a unique object, and a device ID indicative of a unique mobile device. The processor is configured to predict a spatial relationship between the user, the object, and the mobile device. The prediction is based, in part, on the user ID, the object ID, and the device ID, where the prediction includes a geographic location for each of the user, the object, and the mobile device. The processor compares a location of at least two of the user, the object and the mobile device with the prediction of the spatial relationship between the user, the object, and the mobile device. The processor then transmits a reminder message indicative of a forgotten object when the prediction of the spatial relationship exceeds a predetermined threshold.

In another exemplary embodiment, a system for generation and transmission of a reminder message includes a processor configured to obtain a unique user profile comprising a user identification (ID) indicative of a unique user, an object ID indicative of a unique object, and a device ID indicative of a unique mobile device. The processor is configured to predict a spatial relationship between the user, the object, and the mobile device. The prediction is based, in part, on the user ID, the object ID, and the device ID, where the prediction includes a geographic location for each of the user, the object, and the mobile device. The processor compares a location of at least two of the user, the object and the mobile device with the prediction of the spatial relationship between the user, the object, and the mobile device. The processor then transmits transmit a reminder message indicative of a forgotten object when the prediction of the spatial relationship exceeds a predetermined threshold.

In another exemplary embodiment, a computer program product for generation and transmission of a reminder message is described. The computer program product includes a computer readable storage medium on which program instructions are saved. The program instructions are executable by a processor to cause the processor to perform a method. The method includes obtaining, via a processor, a unique user profile. The user profile includes a user identification (ID) indicative of a unique user, an object ID indicative of a unique object, and a device ID indicative of a unique mobile device. The processor is configured to predict a spatial relationship between the user, the object, and the mobile device. The prediction is based, in part, on the user ID, the object ID, and the device ID, where the prediction includes a geographic location for each of the user, the object, and the mobile device. The processor compares a location of at least two of the user, the object and the mobile device with the prediction of the spatial relationship between the user, the object, and the mobile device. The processor then transmits a reminder message indicative of a forgotten object when the prediction of the spatial relationship exceeds a predetermined threshold.

In yet another exemplary embodiment, the reminder message is transmitted to the mobile device configured to output the message.

In another exemplary embodiment, the reminder message is transmitted to a vehicle control system configured to output the message.

In an exemplary embodiment where the reminder message is transmitted to the vehicle control system, the user profile further includes a vehicle ID.

In another exemplary embodiment where the reminder message is transmitted to the vehicle control system, the user profile includes a user object and device history indicative of one or more of the device and the object and a location, a time associated with the location.

In another exemplary embodiment where the reminder message is transmitted to the vehicle control system, the processor is configured for transmitting the reminder message to an unassociated vehicle that is not associated with the user. The reminder message includes routing information configured to cause the unassociated vehicle to transmit the message to one of another unassociated vehicle or the vehicle control system.

In another exemplary embodiment where the reminder message is transmitted to the vehicle control system, the processor determines whether the vehicle ID is static or dynamic respective to the user, and evaluates the geographic location of the user with respect to the geographic location of the mobile device and a prediction of a vehicle control system associated with the user ID. The processor transmits the reminder message to only one of the vehicle control system and the mobile device based on the vehicle ID, the geographic location of the user, and the geographic location of the mobile device.

In an exemplary embodiment where the reminder message is transmitted to the vehicle control system, responsive to determining that the geographic location of the user does not match the predicted geographic location of the mobile device the processor is configured to evaluate, based on the geographic location of the user and the geographic location of the mobile device, whether the user is carrying the mobile device. The processor then selects either the mobile device or the vehicle control system as a recipient for the reminder message.

In an embodiment where the reminder message is transmitted to the vehicle control system, the processor is configured for predicting the spatial relationship based on a one or more calendar entries of a calendar associated with the unique user.

The above features and advantages and other features and advantages are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
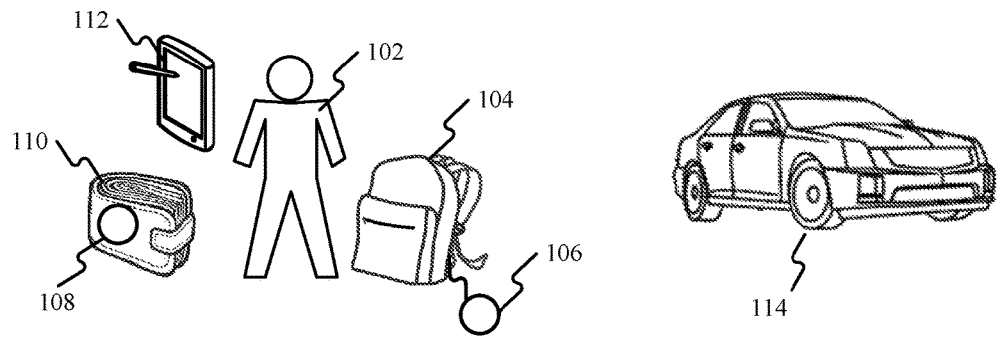
FIG. 1 is a diagram of a user associated with various objects, a mobile device, and a vehicle.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 illustrates a user 102 associated with various personal items such as, for example, a bag 104, a wallet 110, and a mobile device 112. User 102 is said to be associated with mobile device 112 and personal objects 110 and 104 in that user owns or regularly (i.e., two or more times) uses those items. Although only one mobile device 112 and two objects 110 and 104 are depicted in FIG. 1, it is appreciated that any number of object and mobile devices are contemplated by embodiments, and any specific number or type of object or mobile device is not meant to be limiting.

Figure 11:
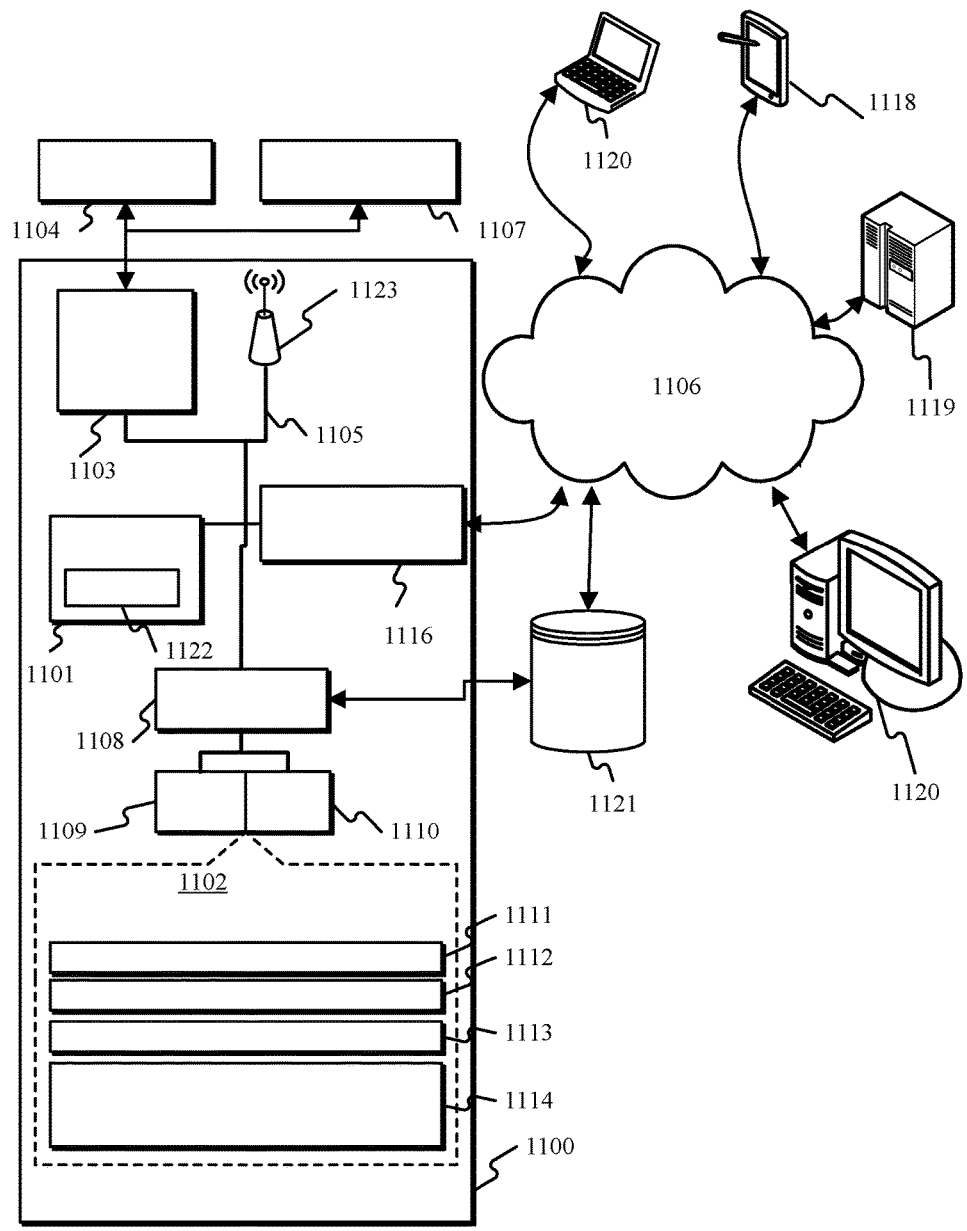
FIG. 11 is a diagram of a computer system and environment according to one embodiment.

In one aspect, user 102 may be associated with one or more vehicles, such as, for example, vehicle 114. User 102 is said to be associated with vehicle 114 in that she owns or operates that vehicle regularly (i.e., two or more times). In another aspect, user 102 may be associated with a vehicle when she operates a plurality of vehicles as part of a vehicle share scheme. For example, user 102 may use a particular vehicle for one portion of a journey, and a different vehicle (e.g., vehicle 114) on a return or separate leg of the trip. In some aspects, vehicle 114 may represent any one vehicle in the plurality of vehicles that share a common communication network. Vehicle 114 may be, for example, a car, a truck, an autonomous vehicle, a semi-autonomous vehicle, a bicycle, a personal motorized vehicle, a personal aircraft, an autonomous aerial vehicle, and/or other mode of personal transport. Vehicle 114 includes a computer such as, for example, computer 1100 as depicted in FIG. 11. The computer of vehicle 114 may be integrated within the vehicle. In other aspects, the computer of vehicle 114 may be a separate device or system operatively connected to the vehicle.

Wallet 110 is illustrated with a Bluetooth low-energy (BLE) tag 108. Similarly, bag 104 includes a BLE tag 106. In one aspect, mobile device 112 may be in communication with wallet 110 and bag 104 via Bluetooth low-energy (BLE) communication enabled by BLE tags 108 and 106, respectively. BLE tags come in various sizes and shapes that can vary in dimension based on the power source integrated within the device. As shown in FIG. 1, a BLE tag may be integrated with any object or item of suitable dimension.

Although not exhaustive, a brief discussion of BLE technology is provided in the following paragraphs as a background for embodiments. BLE tags, sometimes referred to as "beacons," support one or more low energy protocols that transmit a low-energy signal on a single battery for an extended duration (e.g., 1-5 years or more). BLE tags transmit a low-energy signal within a predetermined spectrum range (e.g., 2.4 GHz-2.4835 GHz). The signal transmits relatively short distances compared to other forms of radio communication. For example, some BLE tags may transmit a Bluetooth signal up to 200 meters.

Figure 4:
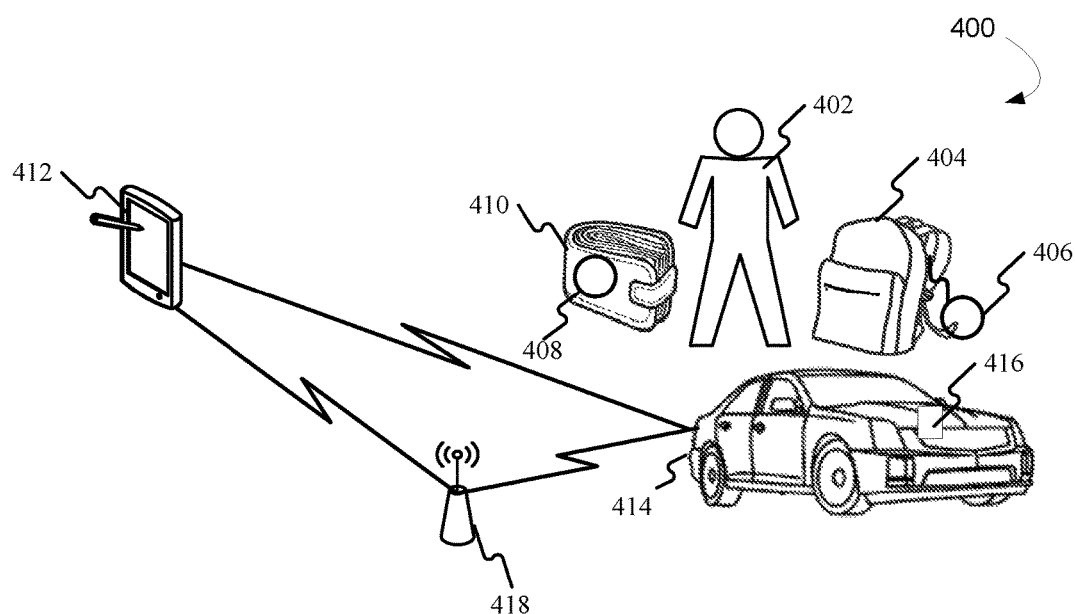
FIG. 4. is a diagram of a system for automation of generation and transmission of a reminder message according to one embodiment.

BLE communication generally consists of two main parts (operational modes): advertising and connecting. Advertising is a one-way discovery mechanism. BLE-enabled devices (e.g., BLE tags 106 and 108) request discovery by transmitting packets of data in predetermined intervals (e.g., from 20 ms to 10 seconds). The shorter the interval, the shorter the battery life, but the faster the device can be discovered by a device listening (e.g., mobile device 412 as shown in FIG. 4 and/or a vehicle controller operating in vehicle 114) on the predetermined signal spectrum.

The operational mode of a BLE tag is changeable by its interaction with one or more listening devices, or by pre-configuration. The packets transmitted by BLE tags can change based on the operational mode of the BLE tag. For example, according to one Bluetooth specification for BLE communication, the packets can be up to 47 bytes in length, and include a 1 byte preamble, a 4 byte access address, 2-39 bytes advertising channel PDU, and 3 bytes for cyclic redundancy checking (CRC). BLE devices can operate in a non-connectable advertisement-only mode (where all the information is contained in the advertisement). BLE tags can also allow connections with listening devices through one or more data channels. For advertisement communication (e.g., "to all devices listening, here I am"), the access addresses transmitted by the BLE is always the same. For data channels (e.g., the transmission "to specific vehicle control system: here is some information"), the access address is different for each connection. The data channels also allow a particular BLE tag (e.g., BLE tags 106 and 108) to be matched with a particular device (e.g., mobile device 112 and vehicle controller 416).

According to one or more embodiments, after a listening computer (e.g., mobile device 112 or an automobile control system in vehicle 114) discovers a BLE-enabled transmitter, a connection can be established by the listening computer/device. The listening computer can then read the services that a BLE tag offers, and for each service its characteristics are read.

Characteristics can include, for example, distance and relative location information with respect to the listening device. For example, as the strength of the signal of the BLE transmitter decreases (predictably as the listening computer gets further from the BLE tag), the listening device can calculate distance information based on the signal propagation time. With triangulation, a precise location of the transmitting BLE tag may be determined respective to the listening device.

Referring again to FIG. 1, user 102 may carry various items on a regular basis including wallet 110, bag 104, and a mobile device 112. Vehicle 114 may be used regularly to transport not only user 102, but also that user's mobile device 112, wallet 110 and bag 104. Because either mobile device and/or vehicle 114 are repeatedly with user 102 at various times, one or more processors can record aspects of the events such that patterns of object, vehicle, and device usage may be identified and recorded. Depending on the situation, a processor in vehicle 114 may observe patterns of user 102 and build a user profile of characteristics of the user. In other aspects, mobile device 112, which user 102 generally carries, may perform the same observation and recording tasks as vehicle 114. In other aspects, both of device 112 and vehicle 114 may generate and update a user profile simultaneously, and may coordinate the independently generated profiles via a wireless communication network (e.g., communication network 1106 depicted with respect to FIG. 11).

Figure 2:
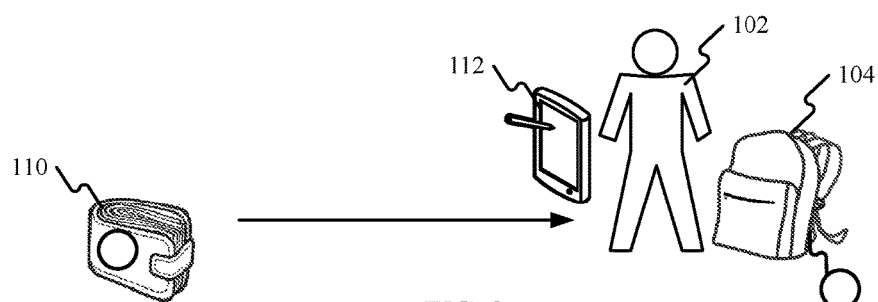
FIG. 2 is a diagram of the user of FIG. 1 after leaving one object behind.

Referring now to FIG. 2, user 102 may leave behind an object such as, for example, wallet 110. Mobile device 112 and bag 104, however, may still be within user's possession. A history of repeating patterns may show that user 102, wallet 110, bag 104, and mobile device 112 should be together in a scenario having aspects in common with a time of detection. For example, for every day in the past month, user 102 may have carried these same objects and devices on a daily basis. In one aspect, mobile device 112 may perform various identification, prediction, comparison, and transmission steps to determine that mobile device 112 has been left behind (i.e., user 102 is no longer in possession of device 112 in her possession when such possession was intended). Mobile device 112 may output an alert (e.g., a reminder message) indicating that user 102 has forgotten or left behind wallet 110. In other aspects, mobile device 112 may make the determination of the forgotten item, and may transmit, to vehicle 114, information with which a vehicle control system may alert user 102.

The processor transmits in various ways, depending on the particular device performing the processing steps. In some aspects, mobile device 112 is the processor. Accordingly, processor 1101 transmits the alert to a vehicle controller for output. In another aspect, processor 1101 is a vehicle controller. Accordingly, processor 1101 transmits via wireless connection to a mobile device, or to a connected output device within the vehicle. For example, a vehicle controller may transmit a reminder message that includes sounds, beeps, honks, written messages, audible spoken messages, etc. The vehicle output device may receive the transmitted message from the vehicle controller.

In other aspects, the vehicle output device may receive the transmitted message from the vehicle controller, where the vehicle controller received the message from another source. Another source may be, for example, another vehicle's controller, a server, mobile device 112, etc.

In other aspects, the vehicle output device and/or mobile device 112 may receive a reminder message transmitted from a connected server. In one aspect, the connected server performs the various processing steps as a distributed resource.

Figure 3:
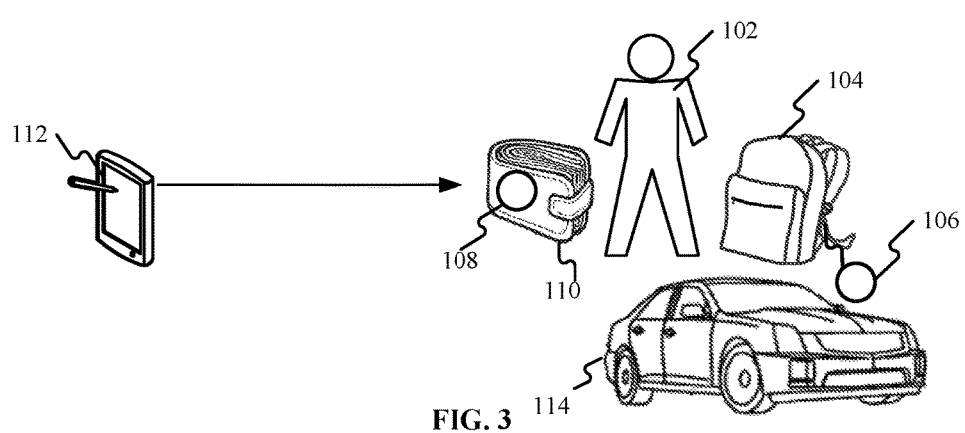
FIG. 3 is a diagram of the user of FIG. 1 after leaving a mobile device behind.

FIG. 3 depicts user 102 with wallet 110 and bag 104 after leaving device 112 behind. Accordingly, mobile device 112, that has access to a user profile having a history or record of repeated triggering events, may perform various identification, prediction, comparison, and transmission steps to determine that it has been left behind because one or more BLE tags 108 and 106 are not within transmission distance for a predetermined period of time (e.g., 1 minute, 5 minutes, one hour, etc.). In one aspect, mobile device 112 may transmit the reminder message to a vehicle control system (e.g., a controller in vehicle 114). The controller may be configured to output the reminder message.

Still referring to FIG. 3, in another aspect, vehicle 114 has access to a user profile having a history or record of repeated triggering events, and may perform the various identification, prediction, comparison, and transmission steps to determine that mobile device 112 has been left behind. For example, because one or more BLE tags 108 and 106 are within a receivable transmission distance of vehicle 114 for a predetermined period of time (e.g., 1 minute, 5 minutes, one hour, etc.), but one or more devices or objects associated with user 102 is missing, a reminder message is output by vehicle 114 that a forgotten mobile device is left behind. Vehicle 114 may determine that a forgotten object was left behind when a user profile associated with user 102 shows, through a past history or record, that there is a high probability that user 102 has inadvertently left behind the mobile device. A probability can be, for example, a determined probability exceeding a predetermined threshold. The threshold may be, for example, 50%, 70%, 90%, etc.

Now, considering embodiments in greater detail, FIG. 4 depicts a system 400 for generation and transmission of a reminder message, according to some embodiments.

System 400 includes one or more wireless communication systems 418 (hereafter "communication system 418"), and one or more vehicles 414 operatively connected with communication system 418. Although not necessarily part of system 400, a user 402 may carry with him one or more objects including, for example, wallet 410 and bag 404. Wallet 410 may include a BLE tag 408. Bag 404 may include a BLE tag 406. Any number of devices and objects having connected BLE tags may be included. Mobile device 412 is configured for BLE communication with one or more objects having BLE communication (e.g., wallet 410 and bag 404). Vehicle 414 may be configured with a vehicle control system 416 (hereafter "vehicle controller 416"). Vehicle controller 416 is operatively connected to mobile device 412 via communication system 418.

In other aspects, vehicle controller 416 may be operatively connected to mobile device 412 by direct communication with the vehicle controller without an intervening communication network (e.g., vehicle communication network) such as communication system 418. That is to say, mobile device 412 may connect with vehicle controller 416 via Bluetooth or another protocol.

Communication system 418 may be, for example, a vehicle-to-vehicle (V2V) communication technology, a server to vehicle communication technology, a mobile (cellular) network, and/or any other network by which vehicle 414 may communicate with one or more other vehicles (not shown), and/or with mobile device 412.

Vehicle controller 416 may be a main vehicle controller, a control module, or a stand alone device configured to communicate on behalf of vehicle 414.

Figure 5:
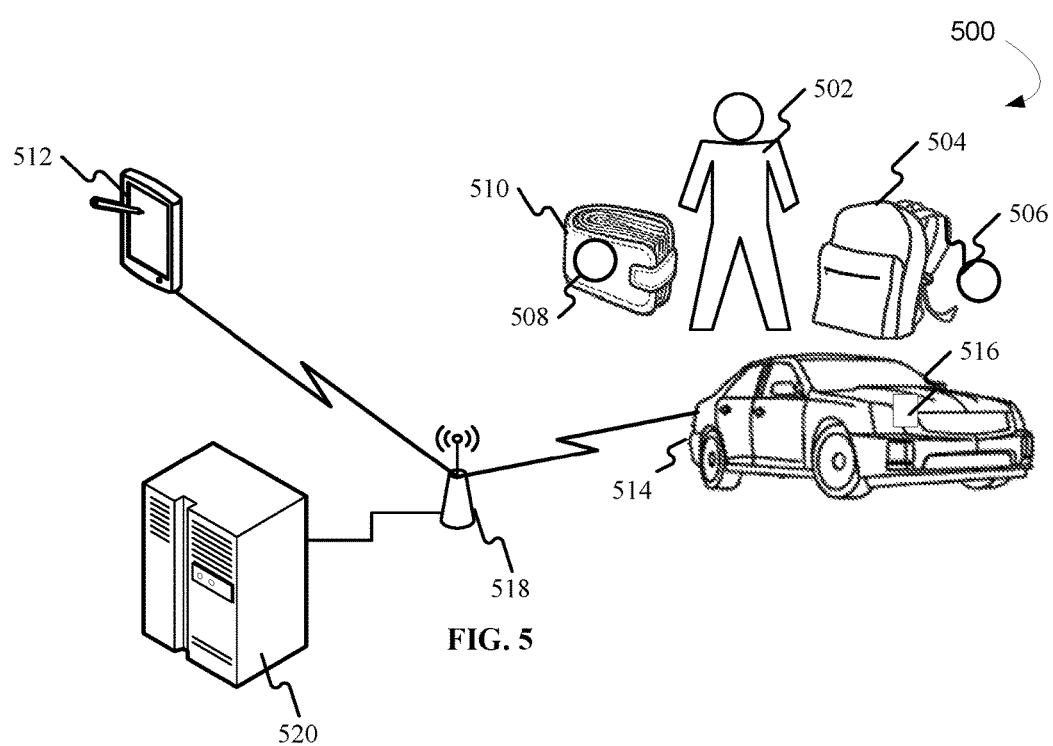
FIG. 5 is diagram of a system for automated generation and transmission of a reminder message according to another embodiment.
Figure 6:
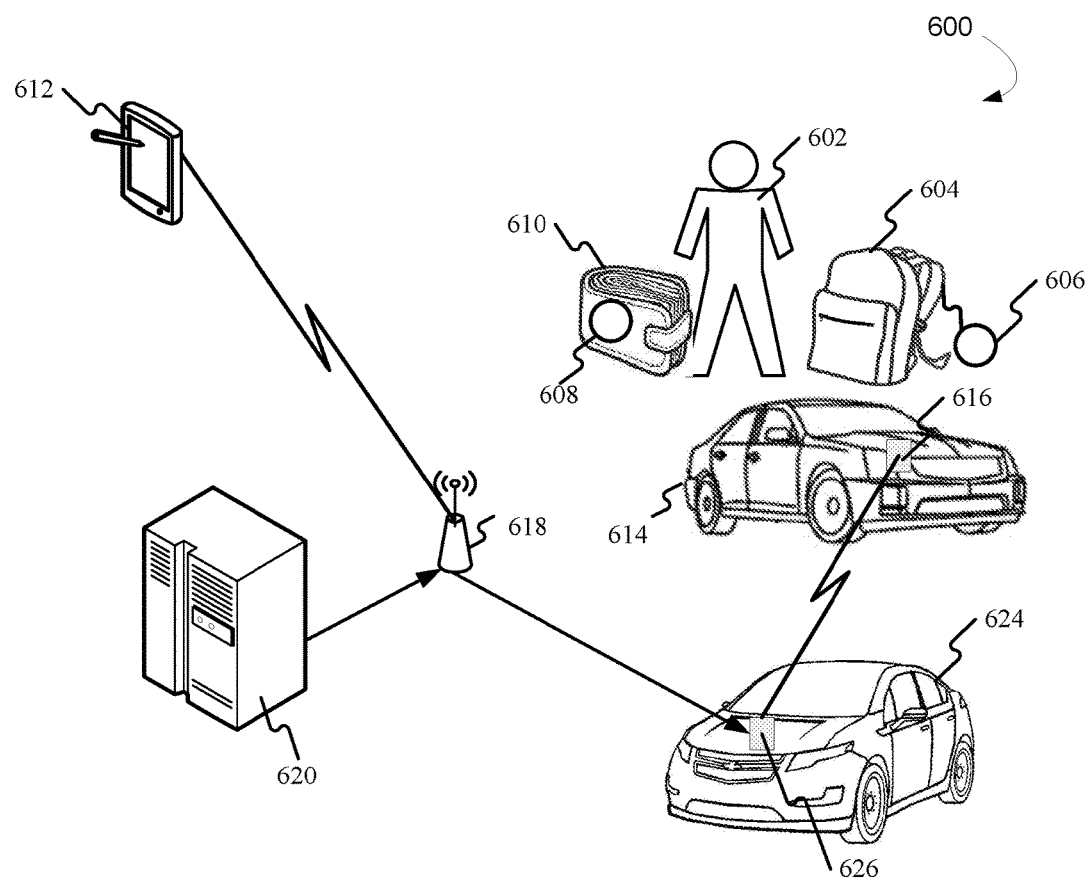
FIG. 6 is a diagram of a system for reminder message automation according to another embodiment.

In some aspects, one or more processors (e.g., a processor in mobile device 412 and/or a processor in vehicle controller 416) perform various steps according to one or more predetermined rules to yield a technical effect. Although later discussed in detail, FIG. 11 depicts an exemplary computer system 1100 that includes a processor 1101. Computer system 1100, and thus processor 1101 may apply to any mobile device (e.g., mobile device 112), any vehicle controller (e.g., vehicle controller 416), any one or more servers 520 (as shown in FIG. 5), 620 (as shown in FIG. 6), etc.

According to one embodiment, as shown in FIG. 4, user 402 has left behind mobile device 412. Processor 1101 is configured to obtain a unique user profile that includes a user identification (ID). The user ID is associated with a unique user, such as, for example, user 402. The user ID includes information associated with one or more object IDs indicative of a unique object (e.g., wallet 410 and bag 404), and one or more device IDs indicative of a unique mobile device (e.g., mobile device 412). The unique object ID uniquely identifies BLE tag 408 respective to wallet 410, and BLE tag 406 respective to bag 404. The user profile includes information indicative of date, time, location, object ID, vehicle ID, calendar information, and other information associated with user 402.

In one embodiment, processor 1101 determines, based on the user profile and observations of the presence or absence of two or more devices and/or objects, whether user 102 has misplaced an item. For example, in one aspect, processor 1101 may predict a spatial relationship between user 402, objects 410 and 404 (wallet 410 and bag 404), and mobile device 412. A prediction of a spatial relationship is used by processor 1101 to determine whether a predicted distance between two or more bodies including, for example, mobile device 412, wallet 410, bag 404, and vehicle 414, matches a detected distance between those two or more bodies at the time of the prediction.

The prediction is based, in part, on the user ID, the object IDs, and the device IDs contained in the user profile. In one aspect, the prediction includes a geographic location for each of the bodies at a specific date, time, triggering event, etc. For example, processor 1101, based on the user profile, predicts that on Tuesday afternoons (the current day and time) user 402 is not at the office (determined by a GPS location on one or more of mobile device 412 and/or vehicle controller 416). The user profile indicates that on Tuesday afternoons, user 402 is at one of three non-office places that include a golf course, a user home address, or a bar and grill.

The user profile also indicates spatial relationships between object IDs and device IDs, both with respect to time, date, location, and other information. For example, the user profile includes information indicating that on 6 of the previous 10 Tuesday afternoons during the summer, user 401 carried with her the following items: bag 404, wallet 410, and mobile device 412. As one example, on Tuesday afternoons, the user history indicates that mobile device 412 is usually (e.g., within a predetermined threshold of repeated triggering events) within 15 feet of wallet 410 and bag 404, but not always near (e.g., less than a second predetermined threshold of distance such as 100 feet) of vehicle 414. Predetermined thresholds of probability can include ranges of probability that indicate an occurrence of a particular triggering event. For example, a triggering event (Tuesday golf) may produce a predetermined probability (65%-90%) that wallet 410 and bag 404 are within a predetermined or observed threshold of distance (e.g., 2 feet-15 feet) of mobile device 412. The predetermined threshold of probability is based on observed patterns, where processor 1101 makes the observations over time and records patterns to the user profile. Over time, a user profile may indicate predetermined probabilities for certain combinations of events as described herein.

Triggering events may be other types of events such as, for example, a geographic location associated with a date, a calendar event from user 402's calendar, a vehicle's (e.g., vehicle 414) velocity along a particular route (GPS coordinates), a determination that user 402 is walking instead of driving, a determination that user 402 is using a shared vehicle (dynamically changing) instead of a family vehicle (static with respect to user 402), etc.

The user profile includes information indicative of triggering events, such as, for example, time, date, location, etc. The triggering events are associated with one or more particular devices stored in a device log, one or more particular vehicle identifications stored in a vehicle ID log, and one or more instances of location information with respect to each of these triggering events, devices, vehicle(s), calendar items, etc.

Processor 1101, based on the user object and device history stored in the user profile, makes a prediction of where each of mobile device 412, wallet 410, bag 404 and vehicle 414 should be at the current time. Processor 1101 compares the location of at least two of the user 402 (which may be determined by a second identifying mobile device on the user's person, and/or vehicle 414), the objects (wallet 410 and bag 404), and the mobile device 412, with the prediction of the spatial relationship between each of those bodies. Processor 1101 compares the location of at least two of the bodies associated with user 402, and make a determination determinative of whether one or more things that should be with user 402 at the present time (based on user profile information) have been left behind.

As shown in FIG. 4, mobile device 412 has been left behind. In some aspects processor 1101 transmits a reminder message indicating that a forgotten object was left behind when the prediction of the spatial relationship exceeds a predetermined threshold. In some aspects the forgotten object is a mobile device (e.g., mobile device 412), or any other item configured with a BLE tag operative with system 400. Accordingly, processor 1101 may transmit the reminder message to vehicle 414. When user 402 arrives at vehicle 414, vehicle controller 416 can output the message by, for example, sounding an alert, flashing an interior light, outputting an in-dash message in an output device, making an audible spoken message alert, sounding a horn, etc.

In another aspect, if it was another object left behind (e.g., bag 404), processor 1101 may transmit the reminder message to mobile device 412, because user 402 most likely is carrying the mobile device. Mobile device 412 can output the reminder message to alert user 402 of the forgotten object. Alternatively, mobile device 412 can cause another output device to output the reminder message (e.g., a laptop, computer, vehicle dash screen, etc.).

FIG. 5. illustrates a system 500 for generating and transmitting a reminder message, according to one embodiment. System 500 includes one or more wireless communication systems 518 (hereafter "communication system 518"), and one or more vehicles 514 operatively connected with communication system 518. Although not necessarily part of system 500, a user 502 may carry with him one or more objects including, for example, wallet 510 and bag 504. Wallet 510 may include a BLE tag 508. Bag 504 may include a BLE tag 506. Any number of devices and objects having connected BLE tags may be included. Mobile device 512 is configured for BLE communication with one or more objects having BLE communication (e.g., wallet 510 and bag 504). Vehicle 514 may be configured with a vehicle control system 516 (hereafter "vehicle controller 516"). Vehicle controller 516 is operatively connected to mobile device 512 via communication system 518.

As illustrated in FIG. 5, communication system 518 may be operatively connected to one or more servers such as, for example, server 520. Server 520 may perform one or more computing steps (e.g., processor 1101 may be a processor in server 520). In other aspects, server 520 may store and deliver user profiles to mobile device 512 and/or vehicle 514. Server 520 may include a user profile database.

Figure 7:
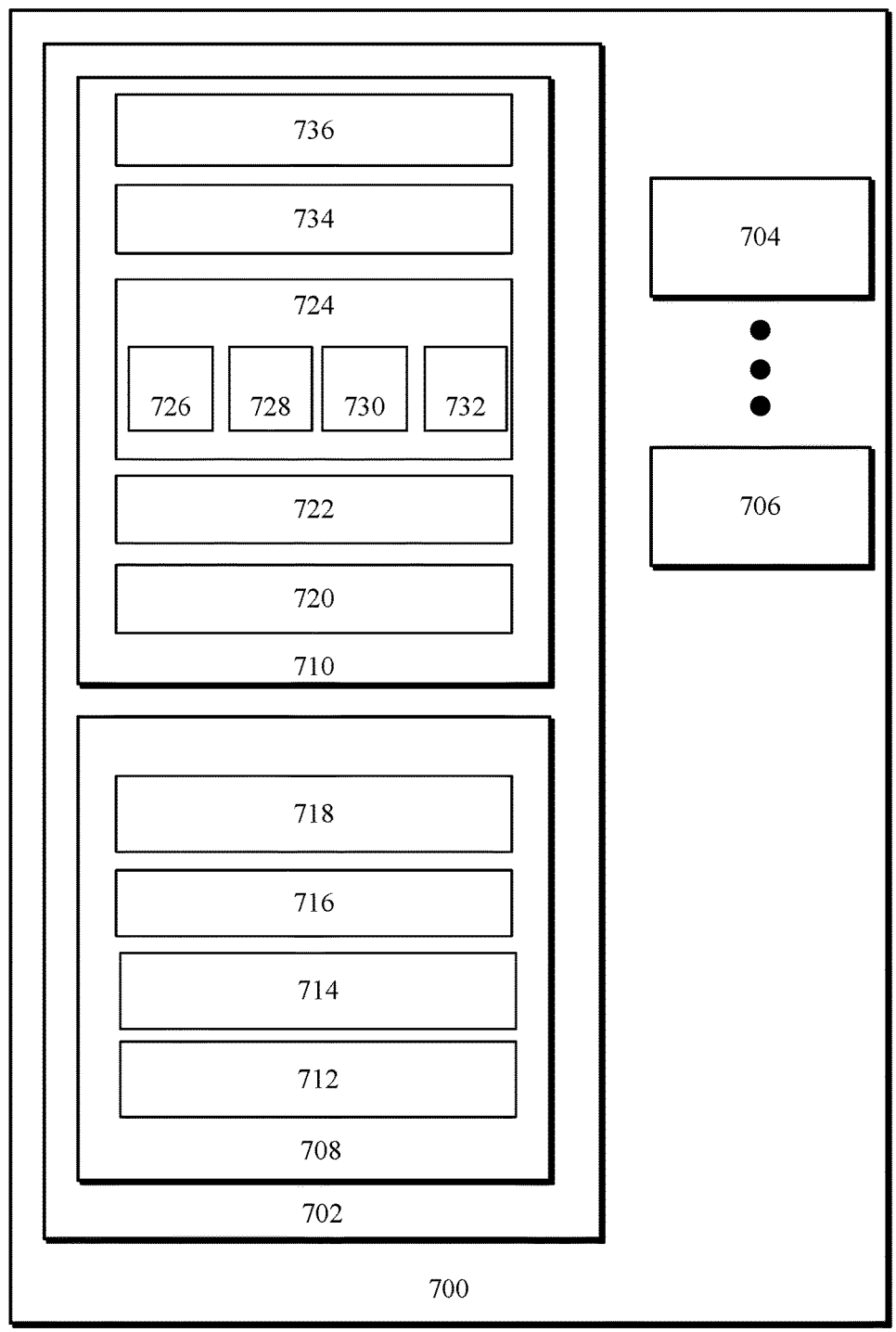
FIG. 7 is a diagram of a user profile in a user profile database according to one embodiment.

Referring, briefly, to FIG. 7, a block diagram of a user profile 702 in a user profile database 700 is illustrated, according to one embodiment. Referring now to FIG. 7, user profile database 700 may include a plurality of unique user profiles such as, for example, user profile 702. User profile database 700 includes numerous database records, as illustrated with database records 704, 706, etc. User profile 702 includes a unique user ID 708 and a user object and device history 710. User profile database may be stored on one or more operatively connected storage devices such as, for example, a server, a mobile device, a vehicle controller, etc. In other aspects, one or more of a vehicle controller, a mobile device, and/or a server may request and store a user profile 702, or a limited number of other user profiles (e.g., 704, 706, etc.) without storing the entirety of database 700.

User ID 708 includes fields indicative of one or more object IDs 712, one or more vehicle ID records 714, one or more vehicle statuses 716, and one or more mobile device IDs 718. Object ID 712 uniquely identifies a unique object (e.g., wallet 110). Object ID 712 includes identification information associated with the particular BLE tag associated with the object (e.g., BLE tag 108 associated with wallet 110).

Vehicle ID 716 indicates a unique vehicle such as, for example, vehicle 114, associated with the user. In some aspects, a user may have one, two, five, etc. unique vehicles associated with their user profile 702. In other aspects, the user may participate in a vehicle sharing scheme where more than one vehicle is used by that user, which may or may not repeat. Accordingly, vehicle status 716 may identify whether the vehicle ID 714 is a static vehicle (user owns that particular vehicle) or a dynamic vehicle (e.g., a ride sharing vehicle).

Mobile device ID 718 identifies one mobile device associated with (regularly used by) the user.

One or more embodiments predict the spatial relationships between the bodies associated with the user that are recorded in user ID 708. Over time, use patterns are observed by processor 1101. Characteristics of the use patterns are stored in user object and device history 710 (hereafter "history 710"). History 710 includes a device log 720 that records mobile device ID 718 details with respect to time. Details include, for example, times of mobile device usage, object IDs 712 associated with the mobile device over time (use patterns, object combinations with respect to time, calendar events, and/or other triggering events), etc.

History 710 further includes user calendar information 722 indicative of one or more calendar entries for that user. For example, times, places, events, etc. that are planned in advance and entered in a digital calendar application accessible and shared with user profile 702.

History 710 can include triggering event log 724, which may be configured for recording time information 730, date information 728, location information 726, and event information 732, with respect to time.

In another aspect, history 710 can further include vehicle ID log 734 configured to identify vehicle usage over time with respect to vehicle IDs 716 and vehicle statuses 714.

Location information 736 can include all GPS information indicative of usage patterns. In some aspects, processor 1101 may access information in one portion of user profile 702 to populate and expand other portions of user profile 702. For example, processor 1101 may observe vehicle ID 714 over time with respect to triggering events determined from triggering event log 724. For example, processor 1101 may record a triggering event in triggering event log 724 responsive to observing that mobile device 112 is at City Golf Course on Tuesday three times in a row and within 4 feet of bag 404 and wallet 410 during the entire six hour period of time. Processor 1101 can obtain historic information from user profile 702 to make the observation and prediction based on information stored in history 710.

FIG. 6 depicts a system 600 for reminder message automation according to another embodiment. System 600 includes one or more wireless communication systems 618 (hereafter "communication system 618"), and one or more vehicles 614 operatively connected with communication system 618. Although not necessarily part of system 600, a user 602 may carry with him one or more objects including, for example, wallet 610 and bag 604. Wallet 610 may include a BLE tag 608. Bag 604 may include a BLE tag 606. Any number of devices and objects having connected BLE tags may be included. Mobile device 612 is configured for BLE communication with one or more objects having BLE communication (e.g., wallet 610 and bag 604). Vehicle 614 may be configured with a vehicle control system 616 (hereafter "vehicle controller 616"). Vehicle controller 616 is operatively connected to mobile device 612 either directly or indirectly via another one or more vehicle(s) in a vehicle to vehicle network. The connection topology is referred to as "via communication network 618," the connection path may vary, and the communication network may include or exclude one or more communication paths shown in FIG. 6.

Referring now to FIG. 6, in some aspects a user 602 may leave behind a mobile device 612 (or another object). If user 602 is not uniquely associated with a single vehicle, but instead uses a different vehicle on a regular basis as part of a vehicle sharing scheme, then processor 1101 may transmit a message to vehicle controller 616 either directly (e.g., a server 620 has user information in user profile 702 that associates user ID 708 with a network of vehicles (identified by vehicle status 716). Accordingly, server 620 may determine, based on the user profile 702, that user 602 is currently using vehicle 614 (stored in vehicle ID 714, and logged in vehicle ID log 734). In some aspects, processor 1101 may transmit the reminder message directly to vehicle controller 616 via communication system 618. In other aspects, processor 1101 may transmit the reminder message to an unassociated vehicle (e.g., unassociated vehicle 624) that is not associated with the user. Vehicle 624 may be part of a vehicle-to-vehicle communication network (e.g., communication system 618), which can send and receive communications to and from other vehicles, to and from signal access points and/or transceivers, and/or any combination thereof. Accordingly, the reminder message includes (is encoded with) routing information configured to cause the vehicle controller 626 in unassociated vehicle 624 to transmit the message to either another unassociated vehicle or the vehicle controller 616 of the current vehicle of the user 602. The communication is routed via communication system 618 for a destination (vehicle 614) via one or more waypoints (e.g., unassociated vehicle 624). For example, the processor may transmit a reminder message to an unassociated vehicle that is not associated with the user 602. The reminder message includes routing information configured to cause the unassociated vehicle 624 to transmit the message to one of another unassociated vehicle (not shown in FIG. 6) or the vehicle control system For example, in one embodiment, processor 1101 may determine whether the vehicle ID 714 is static or dynamic (based on vehicle status 716) respective to the user 602. Processor 1101 may then evaluate the geographic location of user 602 with respect to the geographic location of the mobile device 612, and a prediction of a vehicle controller 616 associated with the user ID 708, and transmit the reminder message based on the comparison of the prediction with the observed locations. Processor 1101 transmits the reminder message to only one of the vehicle control system or the mobile device. Processor 1101 makes the determination of whether to transmit to mobile device 612, vehicle controller 626 or vehicle controller 616 based on the vehicle ID 714, the geographic location of the user (observed from either mobile device associated with mobile device ID 718 and/or GPS information obtained from vehicle controller 616). Other information is usable including vehicle status 716 indicating that the vehicle is or is not static, device log 720 indicating that user 602 has a secondary device configured to receive messages given the current characteristics (day, time, GPS, etc.), and/or other information.

Figure 8:
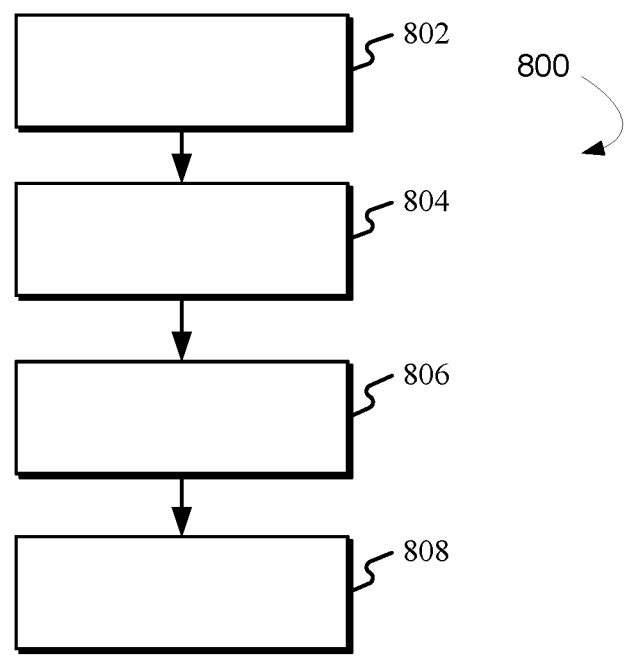
FIG. 8 is a computer-implemented method for message automation according to one embodiment.

FIG. 8 is a flow diagram of a computer-implemented method 800 for message automation according to one embodiment. Referring briefly to FIG. 8, as represented in block 802, processor 1101 obtains a user profile 702 that includes a user ID 708 indicative of a unique user, an object ID 712 indicative of a unique object, and a mobile device ID 718 indicative of a unique mobile device. In one embodiment, user profile 702 further comprises a vehicle ID 714. User profile 702 includes a user object and device history 710 indicative of one or more of the device, the object and a location. In some aspects, user object and device history 710 indicates one or more of the device (e.g., the device associated with mobile device ID 718) with respect to time, the object (e.g., the object associated with object ID 712) with respect to time, and a location (e.g., a location retrieved from a GPS device and stored in location information 726 and/or location information 736) with respect to time.

As represented in block 804, processor 1101 predicts a spatial relationship between the user, the object, and the mobile device associated with user profile 702. The prediction is based, in part, on the user ID 708, the object ID 712, and the mobile device ID 718. The prediction includes a geographic location for each of the user, the object, and the mobile device. In one aspect, processor 1101 predicts the spatial relationships, based on history 710, whether two or more of the object, the mobile device and the user have shared a similar geographic location subsequent to one or more particular events. Processor 1101 can also predict the spatial relationship based on a predetermined threshold of similarity between a current event and the one or more particular events in the user object and history 710. A predetermined threshold of similarity may be, for example, that the current event (e.g., mobile device 112 is currently more than 12 feet from bag 104 while vehicle 114 is traveling more than 25 miles per hour) is within a predetermined threshold of similarity (e.g., within ±10% of distance, and within ±30% of velocity) to a particular event in triggering event log 724. For example, history 710 may include information indicative that on four other occasions in the last month, mobile device 112 was an average of 11.4 feet from bag 104 when vehicle was traveling more than 25 miles per hour.

In another aspect, processor 1101 predicts the spatial relationship based on a one or more calendar entries of a calendar associated with the unique user. For example, processor 1101 may determine, based on user calendar information 722, that the user should be at a doctor appointment at the address of 612 Big Lake Drive between the hours of 2 and 4 pm at the current time. Accordingly, processor 1101 predicts a spatial relationship of six to eight feet between user's mobile device and user's wallet.

As represented by block 806, processor 1101 compares a location of at least two of the user, the object and the mobile device with the prediction of the spatial relationship between the user, the object, and the mobile device. Continuing with the above example of user at the doctor's office, when user's vehicle and user's wallet exceed a predetermined threshold of distance (e.g., more than 8 feet) from the mobile device (which may have fallen out of a jacket pocket at the doctor's office), processor 1101 determines that the user has most likely left the mobile device behind at the doctor's office. Accordingly, processor 1101 may determine, based on history 710 and user ID 708 information, that the mobile device associated with mobile device ID 718 should be with (i.e., have a spatial relationship with) the user at the time just after the scheduled appointment (known from user calendar information 722). When the user arrives at the vehicle in the parking lot, the vehicle controller associated with vehicle ID 714 receives the transmitted signal from object ID 712 (in the wallet) but not the signal transmitted by the mobile device (still in the doctor's office). Bag 104, which is in the trunk, continuously transmits its signal to vehicle controller. User profile 702 indicates in history 710 that vehicle ID 714 should read all of the mobile device, the bag, and the wallet based on one or more factors (e.g., user arrived with all three sharing the spatial relationship). Accordingly, in some aspects, processor 1101 may compare a location of at least two of the user, the object and the mobile device with the prediction of the spatial relationship between the user, the object, and the mobile device, and conclude that the wallet is left behind at the doctor's office.

As represented by block 808, processor 1101 transmits a reminder message indicative of a forgotten object when the prediction of the spatial relationship between the mobile device and the vehicle controller exceeds a predetermined threshold (e.g., 4-12 feet). In other aspects, responsive to determining that the geographic location of the user does not match the predicted geographic location of the mobile device, processor 1101 may evaluate, based on the geographic location of the user and the geographic location of the mobile device, whether the user is carrying the mobile device, and select either the mobile device or the vehicle control system as a recipient for the reminder message. In other words, if user is carrying the mobile device but not the wallet, processor 1101 may transmit directly to the mobile device instead of the vehicle controller.

Embodiments of the present disclosure present a technical solution of automated creation and routing of a reminder messages based on an automatically detected forgotten object or mobile device. Some embodiments solve the technical problem of detection of lost objects and delivery of reminder messages to dynamically-changing user output devices including a vehicle controller, a mobile device, etc. Embodiments may transmit a reminder message from either a vehicle controller, a remote server, or a mobile device, and transmit the reminder message based on a comparison of a prediction of two or more spatial relationships between items associated with a user.

It is understood in advance that although this disclosure includes a detailed description on cloud computing, implementation of the teachings recited herein are not limited to a distributed networking environment. Rather, embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model:

On-demand self-service: a cloud consumer can unilaterally provision computing capabilities, such as server time and network storage, as needed automatically without requiring human interaction with the service's provider.

Broad network access: capabilities are available over a network (e.g., network 1106, as depicted in FIG. 11) and accessed through mechanisms that promote use by heterogeneous thin or thick client platforms (e.g., mobile device 112, laptops, vehicle controller 416, 501, etc.).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter), pool of shared vehicles, vehicle networks, etc.

Rapid elasticity: capabilities can be rapidly and elastically provisioned, in some cases automatically, to quickly scale out and rapidly released to quickly scale in.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models:

Software as a Service (SaaS): the capability provided to the consumer is to use the provider's applications running on a cloud infrastructure. The applications are accessible from various client devices through a thin client interface such as a web browser (e.g., web-based e-mail), a vehicle control system provisioned through a connected vehicle, etc. The consumer does not manage or control the underlying cloud infrastructure including network (e.g., network 1106, as depicted in FIG. 11, and/or communication systems 418, 518, and 618), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 1106, as depicted in FIG. 11 and/or communication systems 418, 518, and 618), servers (e.g., servers 420, 520, 620, etc.), operating systems, or storage, but has control over the deployed applications and possibly application hosting environment configurations (e.g., an after-market system installed on a vehicle and operatively connected to vehicle controller 416).

Infrastructure as a Service (IaaS): the capability provided to the consumer is to provision processing, storage, networks (e.g., network 1106, as depicted in FIG. 11), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Deployment Models:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 9:
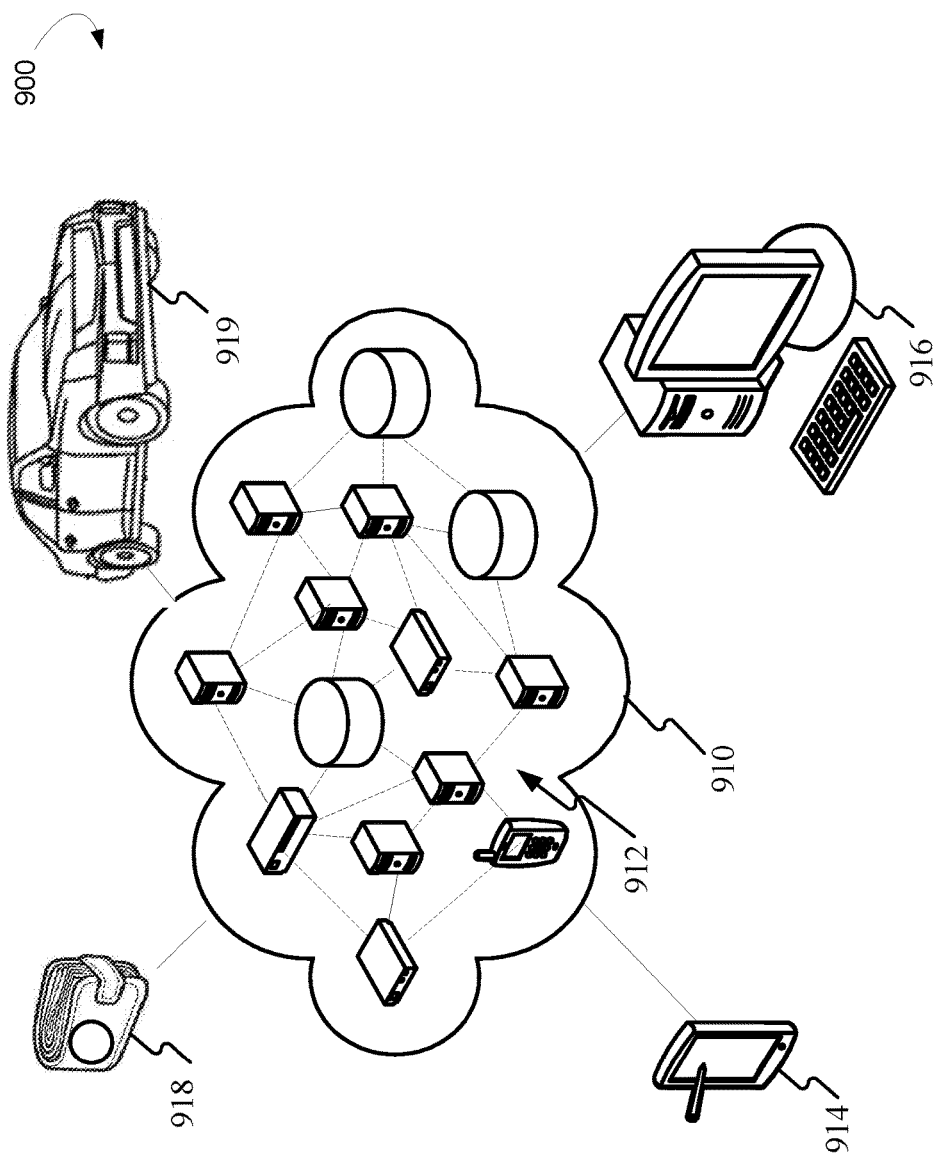
FIG. 9 is a distributed computing environment according to one embodiment.

Referring now to FIG. 9, a distributed networking environment 900 for use in practicing the teachings herein is depicted. As shown in FIG. 9, distributed networking environment 900 includes one or more cloud computing nodes 912 with which local computing devices used by cloud consumers, such as, for example, a mobile device 914, a desktop computer 916, an object with a BLE tag 918, and/or an automobile computer system 919 can communicate. Cloud computing nodes 912 can communicate with one another. They can be grouped (not shown) physically or virtually, in one or more networks 910, such as a Private, Community, Public, or Hybrid clouds as described above, or a combination thereof. This allows distributed networking environment 900 to offer infrastructure, platforms and/or software as services for which a cloud consumer does not need to maintain resources on a local computing device. It is understood that the types of computing devices 914-919 shown in FIG. 9 are intended to be illustrative only and that cloud computing nodes 912 and distributed networking environment 900 can communicate with any type of computerized device over any type of network and/or network addressable connection (e.g., using a web browser).

Figure 10:
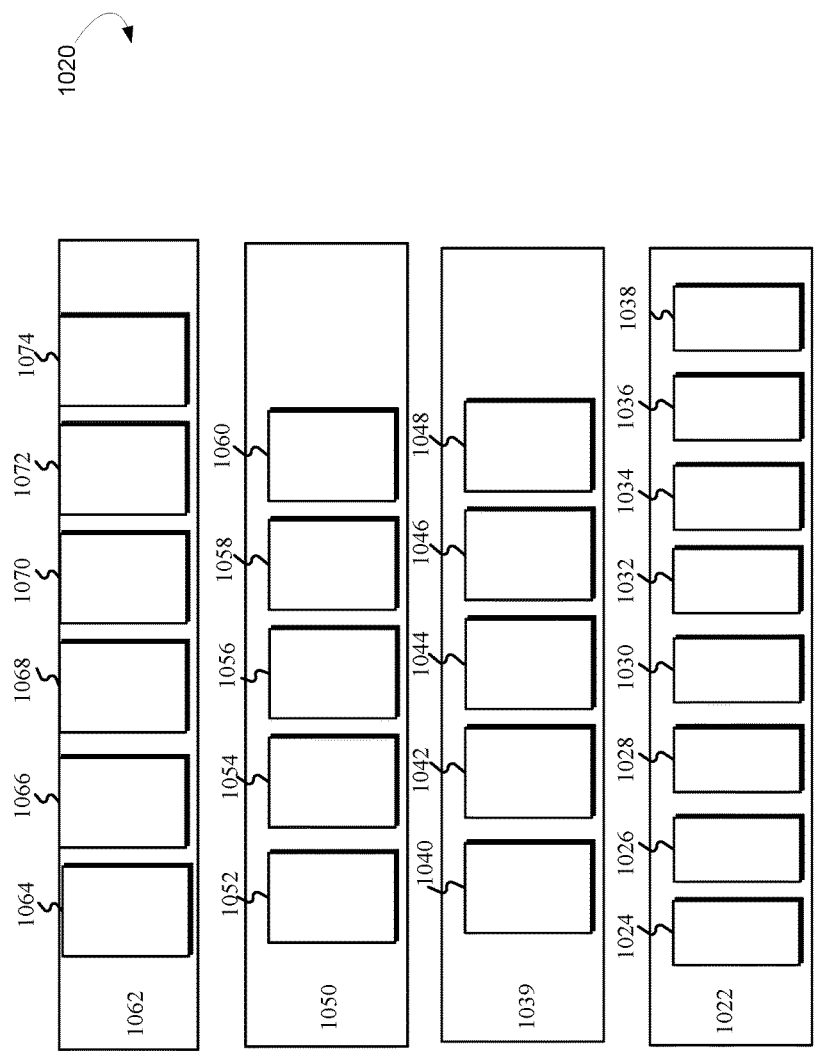
FIG. 10 depicts abstraction layers in the computing environment of FIG. 9 according to one embodiment.

Referring now to FIG. 10, a set of functional abstraction layers 1020 is illustrated, according to one or more embodiments. The set of functional abstraction layers 1020 is provided by distributed networking environment 10 (as depicted in FIG. 9). It should be appreciated that the components, layers, and functions of functional abstraction layers 1020 are illustrative only, and embodiments of the disclosure are not limited thereto. As depicted, the following layers and corresponding functions are provided:

A hardware and software layer 1022 can include hardware and software components. Examples of hardware components can include, for example, mainframes 1024, 10RISC (Reduced Instruction Set Computer) architecture based servers 1026, servers 1028, blade servers 1030, storage devices 1032, and networks and networking components 1034. In some embodiments, software components include network application server software 1036 and database software 1038.

A virtualization layer 1039 can provide an abstraction layer from which the following examples of virtual entities can be provided: virtual servers 1040, virtual storage 1042, virtual networks 1044, which can include virtual private networks, virtual applications and operating systems 1046, and virtual clients 1048.

In one example, a management layer 1050 can provide the functions described below. A resource provisioning module 1052 can provide dynamic procurement of computing resources and other resources that can be utilized to perform tasks within the distributed networking environment. A metering and pricing resource 1054 can provide cost tracking as resources are utilized within the distributed networking environment, and billing or invoicing for consumption of these resources. In one example, metering and pricing resources can include application software licenses, manage vehicle sharing subscriptions, fuel expenses, recharging fees, or mileage-related billing, etc. A user portal 1056 can provide access to distributed networking environment 900 for consumers and system administrators (not shown). In some embodiments, user portal 1056 can provide security and/or identity verification for cloud consumers (e.g., one or more consumers operating one or more of computing devices 914-919) and tasks, as well as protection for data and other resources. A service level management resource 1058 can provide cloud computing resource allocation and management such that required service levels are met. A service level agreement (SLA) planning and fulfillment resource 1060 can provide pre-arrangement for, and procurement of cloud computing resources for which a future requirement is anticipated in accordance with an SLA.

A workloads layer 1062 can provide functionality for which the distributed networking environment can be utilized. For example, workloads layer 1062 can include a mapping and navigation resource 1064, a software development and lifecycle management resource 1066, a vehicle sharing resource 1068, a data analytics processing resource 1070, a transaction processing resource 1072, and a remote prediction engine for predicting left behind devices 1074.

FIG. 11 illustrates a block diagram of an exemplary computing environment and computer system 1100 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer (e.g., server 520, server 620, server 1119, etc.). In another exemplary embodiment, the implementation can be part of a mobile device, such as, for example, a mobile phone (e.g., mobile device 112, 412, 512, 612, etc.). In another exemplary embodiment, the implementation can be part of a vehicle control system (e.g., vehicle controller 416, 501, 616, and 626, etc.). In yet other embodiments, computer system 1100 may exist on a single chip (e.g., a system on a chip or "SOC"). Accordingly, computer system 1100 may include functionality for some or all components depicted as part of computer 1100.

As shown in FIG. 11, the computer 1100 includes processor 1101. Computer 1100 also includes memory 1102 communicatively coupled to processor 1101, and one or more input/output adapters 1103 that can be communicatively coupled via system bus 1105. Memory 1102 can be communicatively coupled to one or more internal or external memory devices via a storage interface 1108. Communications adapter 1116 can communicatively connect computer 1100 to one or more networks 1106. System bus 1105 can communicatively connect one or more user interfaces via input/output (I/O) adapter 1103. I/O adapter 1103 can connect a plurality of input devices 1104 to computer 1100. Input devices can include, for example, a keyboard, a mouse, a microphone, a sensor, etc., an in-dashboard touchscreen, etc. System bus 1105 can also communicatively connect one or more output devices 1107 via I/O adapter 1103. Output device 1107 can include, for example, a display, a speaker, a touchscreen, etc.

Processor 1101 is a hardware device for executing a computer program product having program instructions (aka software), stored in a computer-readable memory (e.g., memory 1102). Processor 1101 can be any custom made or commercially available processor, a central processing unit (CPU), a plurality of CPUs, for example, CPU 1101a-1101c, an auxiliary processor among several other processors associated with the computer 1100, a semiconductor based microprocessor (in the form of a microchip or chip set), or generally any device for executing instructions, a processor in a control module of an automobile control system, etc. Processor 1101 can include a cache memory 1122, which can include, but is not limited to, an instruction cache to speed up executable instruction fetch, a data cache to speed up data fetch and store, etc.

Processor 1101 can be disposed in communication with one or more memory devices (e.g., RAM 1109, ROM 1110, one or more external databases 1121, etc.) via a storage interface 1108. Storage interface 1108 can also connect to one or more memory devices including, without limitation, one or more databases 1121, and/or one or more other memory drives (not shown) including, for example, a removable disc drive, etc., employing connection protocols such as serial advanced technology attachment (SATA), integrated drive electronics (IDE), universal serial bus (USB), fiber channel, small computer systems interface (SCSI), an automobile controller or module, etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing embodiments.

Memory 1102 can include random access memory (RAM) 1109 and read only memory (ROM) 1110. RAM 1109 can be any one or combination of volatile memory elements (e.g., DRAM, SRAM, SDRAM, etc.). ROM 1110 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 1102 can incorporate electronic, magnetic, optical, and/or other types of non-transitory computer-readable storage media. Memory 1102 can also be a distributed architecture, where various components are situated remote from one another, but can be accessed by processor 1101.

The instructions in memory 1102 can include one or more separate programs, each of which can include an ordered listing of computer-executable instructions for implementing logical functions. In the example of FIG. 11, the instructions in memory 1102 can include an operating system 1111. Operating system 1111 can control the execution of other computer programs and provides scheduling, input-output control, file and data management, memory management, and communication control and related services.

The program instructions stored in memory 1102 can further include application data 1112, and for a user interface 1113.

I/O adapter 1103 can be, for example but not limited to, one or more buses or other wired or wireless connections. I/O adapter 1103 can have additional elements (which are omitted for simplicity) such as controllers, microprocessors, buffers (caches), drivers, repeaters, and receivers, which can work in concert to enable communications. Further, I/O adapter 1103 can facilitate address, control, and/or data connections to enable appropriate communications among the aforementioned components.

I/O adapter 1103 can further include a display adapter coupled to one or more displays. I/O adapter 1103 can be configured to operatively connect one or more input/output (I/O) devices 1107 to computer 1100. For example, I/O 1103 can connect a keyboard and mouse, a touchscreen, a speaker, a haptic output device, or other output device. Output devices 1107 can include but are not limited to a printer, a scanner, and/or the like. Other output devices can also be included, although not shown. Finally, the I/O devices connectable to I/O adapter 1103 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 1100 can include a mobile communications adapter 1123. Mobile communications adapter 1123 can include GPS, cellular, mobile, and/or other communications protocols for wireless communication. In some embodiments, mobile communications adapter 1123 can include hardware and software for vehicle-to-vehicle communication in a distributed network, communication between one or more devices via Bluetooth, near field communication, radio frequency identification, and/or other communication protocols.

In some embodiments, computer 1100 can further include communications adapter 1116 for coupling to a network 1106.

Network 1106 can be an IP-based network for communication between computer 1100 and any external device. Network 1106 transmits and receives data between computer 1100 and devices and/or systems external to computer 1100. In an exemplary embodiment, network 1106 can be a managed IP network administered by a service provider. In another embodiment, network 1106 is a vehicle communication network connecting one or more vehicles, servers (e.g., 1119), devices (e.g., 1118), etc. Network 1106 can be implemented in a wireless fashion, e.g., using wireless protocols and technologies, such as WiFi, WiMax, code division multiple access (CDMA), and/or other similar network protocol. Network 1106 can also be a wired network, e.g., an Ethernet network, an ARINC 429 network, a controller area network (CAN), etc., having any wired connectivity including, e.g., an RS232 connection, R5422 connection, etc. Network 1106 can also be a packet-switched network such as a local area network, wide area network, metropolitan area network, Internet network, or other similar type of network environment. The network 1106 can be a fixed wireless network, a wireless local area network (LAN), a wireless wide area network (WAN) a personal area network (PAN), a virtual private network (VPN), intranet or other suitable network system.

Network 1106 can operatively connect computer 1100 to one or more devices including device 1118 and device 1120. Network 1106 can also connect computer 1100 to one or more servers such as, for example, server 1119.

If computer 1100 is a server, workstation, laptop, tablet computer and/or the like, the instructions in the memory 1102 can further include a basic input output system (BIOS) (omitted for simplicity). The BIOS is a set of routines that initialize and test hardware at startup, start operating system 1111, and support the transfer of data among the operatively connected hardware devices. The BIOS is typically stored in ROM 1110 so that the BIOS can be executed when computer 1100 is activated. When computer 1100 is in operation, processor 1101 can be configured to execute instructions stored within the memory 1102, to communicate data to and from the memory 1102, and to generally control operations of the computer 1100 pursuant to the instructions.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network or a wide area network, or the connection can be made to an external computer (for example, through the Internet using an Internet Service Provider or vehicle communication service). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry.

Aspects are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for generation and transmission of a reminder message comprising:
    obtaining, via a processor, a unique user profile comprising a user identification (ID) indicative of a unique user, an object ID indicative of a unique object, and a device ID indicative of a unique mobile device;
    predicting, via the processor, a spatial relationship between the user, the object, and the mobile device, wherein the prediction is based, in part, on the user ID, the object ID, and the device ID, wherein the prediction comprises a geographic location for each of the user, the object, and the mobile device;
    comparing, via the processor, a location of at least two of the user, the object and the mobile device with the prediction of the spatial relationship between the user, the object, and the mobile device;
    evaluating, via the processor, based on the geographic location of the user and the geographic location of the mobile device, whether the user is carrying the mobile device when the prediction of the spatial relationship exceeds a predetermined threshold;
    selecting either the mobile device or the vehicle control system as a recipient for the reminder message; and
    transmitting a reminder message indicative of a forgotten object based on the selection.

2. The computer-implemented method of claim 1, wherein the reminder message is transmitted to the mobile device configured to output the message.

3. The computer-implemented method of claim 1, wherein the reminder message is transmitted to a vehicle control system configured to output the message.

4. The computer-implemented method of claim 3, wherein the user profile further comprises a vehicle ID.

5. The computer-implemented method of claim 3, wherein the user profile comprises a user object and device history indicative of one or more of the device with respect to time, the object with respect to time, and a location with respect to time.

6. The computer-implemented method of claim 3, wherein transmitting the reminder message to the vehicle control system comprises:
    transmitting the reminder message to an unassociated vehicle that is not associated with the user, wherein the reminder message comprises routing information configured to cause the unassociated vehicle to transmit the message to one of another unassociated vehicle or the vehicle control system.

7. The computer-implemented method of claim 6, further comprising:
    determining, via the processor, whether the vehicle ID is static or dynamic respective to the user;
    evaluating, via the processor, the geographic location of the user with respect to the geographic location of the mobile device and a prediction of a vehicle control system associated with the user ID; and
    transmitting, via the processor, the reminder message to only one of the vehicle control system and the mobile device based on the vehicle ID, the geographic location of the user, and the geographic location of the mobile device.

8. The computer-implemented method of claim 1, wherein the selecting comprises:
    selecting either the mobile device or the vehicle control system as a recipient based on the vehicle ID respective to the user, and based on whether the user is carrying the mobile device.

9. The computer-implemented method of claim 8, wherein predicting the spatial relationship between the user, the object, and the mobile device comprises:
    determining, via the processor, based on the user object and device history, whether two or more of the object, the mobile device and the user have shared a similar geographic location subsequent to one or more particular events; and
    predicting the spatial relationship based on a predetermined threshold of similarity between a current event and the one or more particular events in the user object and device history.

10. The computer-implemented method of claim 9, further comprising:
    predicting the spatial relationship based on a one or more calendar entries of a calendar associated with the unique user.

11. A system for generation and transmission of a reminder message comprising:
    a processor configured to:
    obtain a unique user profile comprising a user identification (ID) indicative of a unique user, an object ID indicative of a unique object, and a device ID indicative of a unique mobile device;
    predict a spatial relationship between the user, the object, and the mobile device, wherein the prediction is based, in part, on the user ID, the object ID, and the device ID, wherein the prediction comprises a geographic location for each of the user, the object, and the mobile device;
    compare a location of at least two of the user, the object and the mobile device with the prediction of the spatial relationship between the user, the object, and the mobile device;
    evaluate based on the geographic location of the user and the geographic location of the mobile device, whether the user is carrying the mobile device when the prediction of the spatial relationship exceeds a predetermined threshold;
    select either the mobile device or the vehicle control system as a recipient for the reminder message; and
    transmit a reminder message indicative of a forgotten object based on the selection.

12. The system of claim 11, wherein the processor is configured to transmit the message to a mobile device configured to output the message.

13. The system of claim 11, wherein processor is configured to transmit the reminder to a vehicle control system configured to output the message.

14. The system of claim 13, wherein transmitting the processor is configured to:
    transmit the reminder message to an unassociated vehicle that is not associated with the user, wherein the reminder message comprises routing information configured to cause the unassociated vehicle to transmit the message to one of another unassociated vehicle or the vehicle control system.

15. The system of claim 14, further comprising:
    determining, via the processor, whether the vehicle ID is static or dynamic respective to the user;
    evaluating, via the processor, the geographic location of the user with respect to the geographic location of the mobile device and a prediction of a vehicle control system associated with the user ID; and
    transmitting, via the processor, the reminder message to only one of the vehicle control system and the mobile device based on the vehicle ID, the geographic location of the user, and the geographic location of the mobile device.

16. The system of claim 15, wherein the processor is configured to:
    select either the mobile device or the vehicle control system as a recipient based on the vehicle ID respective to the user, and based on whether the user is carrying the mobile device.

17. The system of claim 16, wherein processor is configured to:
    determine based on the user object and device history, whether two or more of the object, the mobile device and the user have shared a similar geographic location subsequent to one or more particular events; and
    predict the spatial relationship based on a predetermined threshold of similarity between a current event and the one or more particular events in the user object and device history.

18. A computer program product for generation and transmission of a reminder message, the computer program product comprising a computer readable storage medium having program instructions embodied therewith, the program instructions executable by a processor to cause the processor to perform a method comprising:
    obtaining a unique user profile comprising a user identification (ID) indicative of a unique user, an object ID indicative of a unique object, and a device ID indicative of a unique mobile device;
    predicting a spatial relationship between the user, the object, and the mobile device, wherein the prediction is based, in part, on the user ID, the object ID, and the device ID, wherein the prediction comprises a geographic location for each of the user, the object, and the mobile device;
    comparing a location of at least two of the user, the object and the mobile device with the prediction of the spatial relationship between the user, the object, and the mobile device;
    evaluating, via the processor, based on the geographic location of the user and the geographic location of the mobile device, whether the user is carrying the mobile device when the prediction of the spatial relationship exceeds a predetermined threshold;
    selecting either the mobile device or the vehicle control system as a recipient for the reminder message; and
    transmitting a reminder message indicative of a forgotten object based on the selection.

* * * * *